United States Patent [19]

Valdemarsson

[11] Patent Number: 4,467,662
[45] Date of Patent: Aug. 28, 1984

[54] SIGNAL RECTIFIER, ESPECIALLY FOR MAGNETOELASTIC TRANSDUCERS

[75] Inventor: Stefan Valdemarsson, Västerås, Sweden

[73] Assignee: ASEA Aktiebolag, VästerÅs, Sweden

[21] Appl. No.: 485,392

[22] Filed: Apr. 15, 1983

[30] Foreign Application Priority Data

Apr. 19, 1982 [SE] Sweden ................................ 8202432

[51] Int. Cl.³ .............................................. G01L 1/12
[52] U.S. Cl. ............................. 73/862.69; 73/DIG. 2
[58] Field of Search ................ 73/779, 862.36, 862.69, 73/DIG. 2; 324/209

[56] References Cited

U.S. PATENT DOCUMENTS 2,732,713  1/1956  Willits ............................... 73/779 X
3,861,203  1/1975  Dahle ......................... 73/DIG. 2 X
4,100,794  7/1978  Meixner ..................... 73/DIG. 2 X Primary Examiner—Charles A. Ruehl
Assistant Examiner—James R. Giebel
Attorney, Agent, or Firm—Watson, Cole, Grindle & Watson

[57] ABSTRACT

Force measuring equipment has a magnetoelastic transducer with an excitation winding supplied with alternating current, which generates a primary flux in a magnetic core of the transducer, and a measuring winding in which a signal voltage is induced, the signal voltage giving a measure of the force applied to the transducer core. The signal voltage is supplied to signal processing members which are arranged to form an output signal by phase-sensitive rectification of the signal voltage. Control members sense when the primary flux passes a positive and a negative reference level, and switch polarity reversing members at the times during each period of the AC supply when the primary flux with a certain sign of its time rate of change passes the positive reference level and with the opposite sign of its time rate of change passes the negative reference level.

4 Claims, 4 Drawing Figures 4,467,662

SIGNAL RECTIFIER, ESPECIALLY FOR MAGNETOELASTIC TRANSDUCERS

BACKGROUND OF THE INVENTION

1. Field of the Invention

The present invention relates to force measuring equipment which includes a magnetoelastic transducer, which has an excitation winding supplied with alternating current threading a magnetic core of the transducer to generate a primary flux in the core, and a measuring winding, also threading the core, in which a signal voltage is induced which signal voltage is dependent on the force applied to the core. Signal processing members are connected to the measuring winding and are arranged to produce an output signal by phase-sensitive rectification of the signal voltage induced in the measuring winding.

The invention is applicable to any of the types of magnetoelastic transducers in which the signal voltage is generated by the difference between two magnetic alternating fluxes, whereby either the magnetic fluxes can be subtracted, or the voltages induced by both the magnetic fluxes can be subtracted.

2. Description of the Prior Art

The invention will be described here as it is applied to a transducer of the first-mentioned type. Such a transducer, according to Swedish Pat. No. 151,267, is shown in FIG. 1 of the accompanying drawings. The transducer shown in FIG. 1 comprises a laminated core consisting of a plurality of bonded-together, soft-magnetic sheets. The core has four winding holes 1-4, located at the corners of a square. Two windings 5, 6 are wound crosswise through respective diagonally opposite pairs of holes. The winding 5 is supplied with an excitation current $I_P$, and across the winding 6 a signal voltage $U_S$ is obtained. The letter designations P and S refer to the similarity to the primary and secondary windings of a transformer, and in the following discussion it is often helpful to consider them as primary and secondary quantities. If the sheets making up the core are magnetically unoriented, the signal voltage, in an unloaded state of the core, is zero. When the core of the transducer is loaded with a force F, the signal voltage becomes proportional to the applied force. By rectifying the signal voltage, for example by means of phase sensitive rectification, an output signal can be generated in a known manner which is proportional to the applied force F.

In using the above-described transducer, it is known that the signal voltage is highly dependent on the amplitude of the primary or excitation current, and therefore, using the known methods of signal rectification, this amplitude has to be maintained constant and independent of variations in the AC supply voltage, for example by means of a magnetic constant voltage device. However, a disadvantage with such devices is that the waveform of the voltage—and thus of the excitation current—changes with any variation in the AC voltage, and a change in the waveform affects the signal voltage of the transducer and the corresponding output signal during normal, phase sensitive rectification, i.e. with polarity reversal occurring when the excitation current passes the maximum value.

OBJECT OF THE INVENTION

One object of this invention is to provide force measuring equipment of the kind described above, in which variations of the amplitude or waveform of the excitation current do not affect the accuracy of the force measurement.

SUMMARY OF THE INVENTION

According to the invention, rectification of the signal voltage is arranged so that a polarity reversal of the signal voltage occurs when the excitation current having, for example, a negative rate of change passes a negative reference level, and that polarity reversal ends when the excitation current having a positive rate of change passes a positive reference level. The output signal, i.e. the mean value of the rectified signal voltage, is then determined by the value of the secondary flux at the points in time when the excitation current passes a reference level, so that the mean value of the output signal becomes independent of the waveform and amplitude of the excitation current.

What characterizes a force measuring equipment according to the invention will become clear from the appended claims.

BRIEF DESCRIPTION OF THE DRAWINGS

The invention will now be more fully described, by way of example, with reference to the accompanying drawings, in which.

DESCRIPTION OF THE PREFERRED EMBODIMENTS

Figure 1:
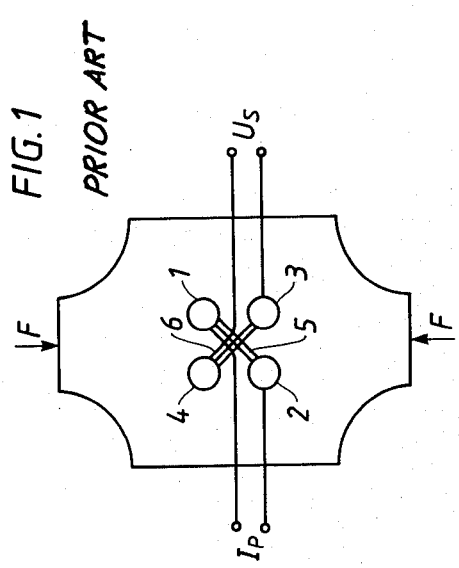
FIG. 1 is a schematic representation of a known magnetoelastic transducer.

FIG. 1 has already been discussed above.

Figure 2A:
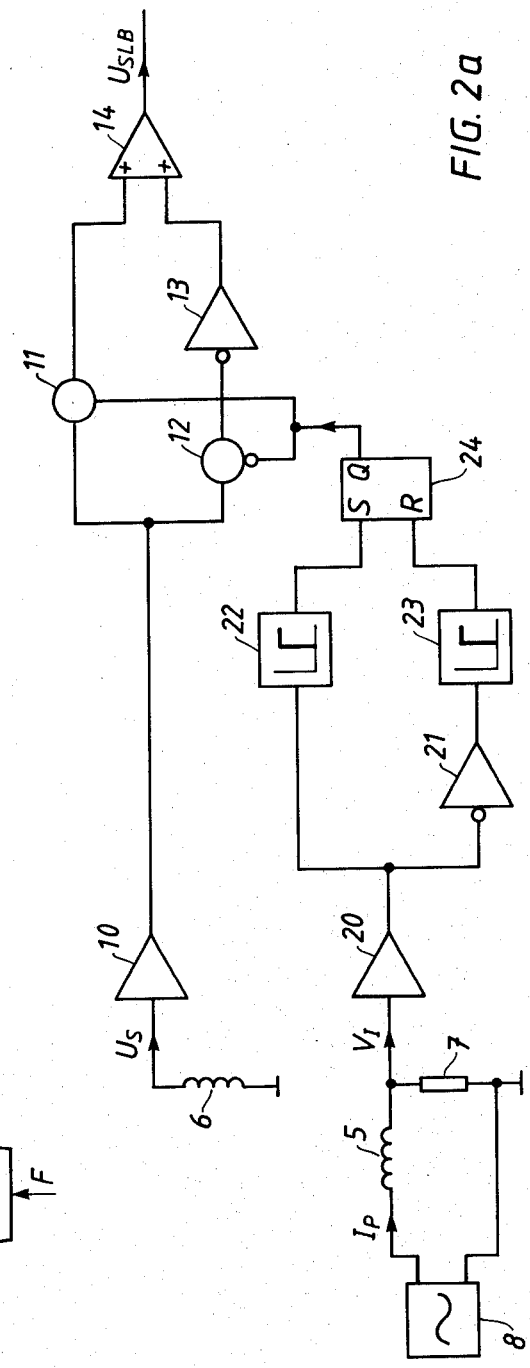
FIGS. 2a and 2b are, respectively, schematic representations of first and second embodiments of force measuring equipment according to the invention.

FIG. 2a shows a first embodiment of force measuring equipment according to the invention. The excitation winding 5 of the magnetoelastic transducer is supplied from an AC source 8, which may be an oscillator with a suitable frequency, for example 50 Hz. In series with the winding 5 there is a resistor 7, and the voltage across the resistor constitutes a voltage $V_I$ which is proportional to the excitation current $I_P$ and thus to the primary flux $\phi_P$. The voltage $V_I$ is fed to an amplifier 20, the output voltage of which is supplied to a first comparator 22 and, via a sign-reversing amplifier 21, to a second comparator 23. The voltage $V_I$ is there compared with the above-mentioned reference levels. The comparator 22 delivers a voltage which sets a bistable flip-flop 24 to the condition corresponding to binary "1" when the voltage $V_I$, proportional to $I_P$, exceeds the positive reference level. The comparator 23 delivers a signal which sets the flip-flop 24 to the condition corresponding to binary "0" when the voltage $V_I$ exceeds the negative reference level. The output voltage of the flip-flop 24 is supplied to two electronic switching members 11 and 12 (shown only symbolically), the latter having an inverted input.

The signal voltage $U_S$ induced in the measuring winding 6 of the magnetoelastic transducer is supplied to an amplifier 10, the output signal of which is supplied—partly via the switching member 11, and partly via the switching member 12 and a sign-reversing amplifier 13—to a summing amplifier 14, the output signal $U_{SLB}$ of which, after filtering in a filter not shown, constitutes the desired measured value of the force F acting on the core of the transducer.

Figure 2B:
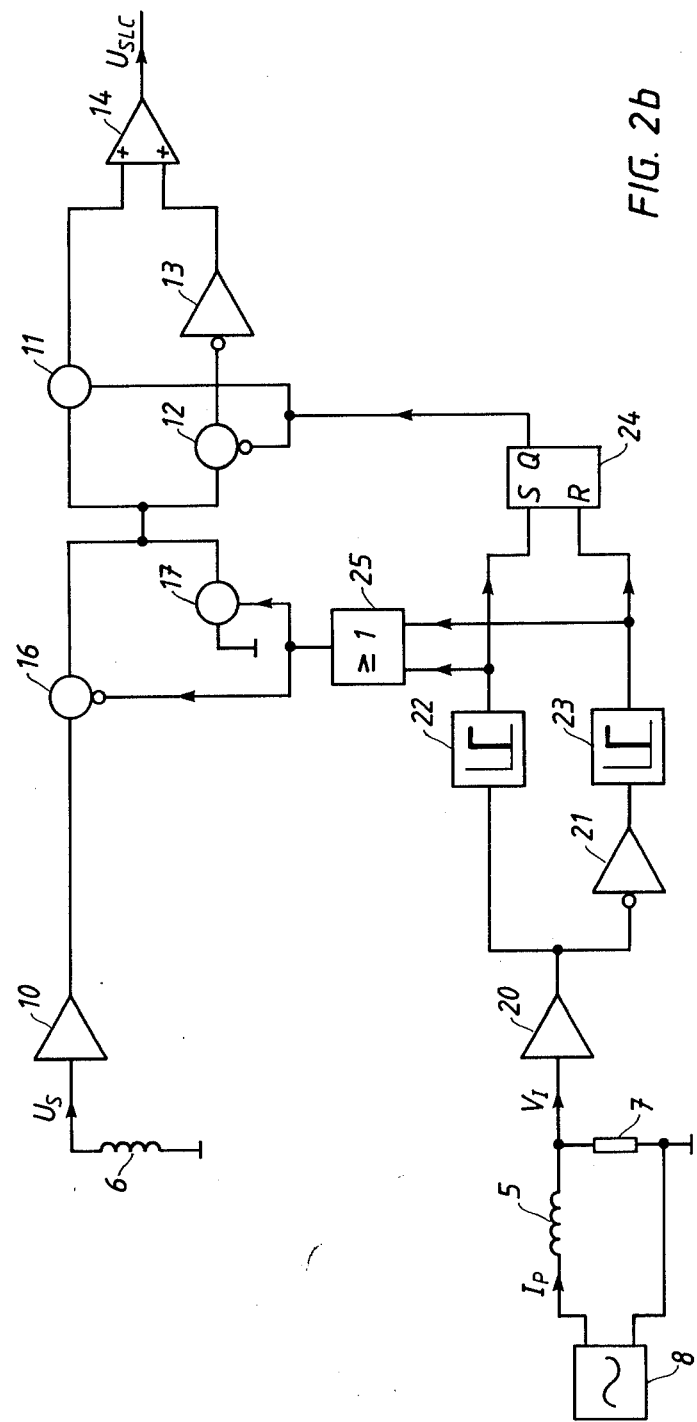

FIG. 2b shows a second embodiment of the invention. It differs from the circuit shown in FIG. 2a, in that two further switching members 16 and 17 are disposed ahead of the switching members 11, 12. The switching members 16 and 17 are controlled by the output voltage from an OR circuit 25, which is supplied with the output voltages from the comparators 22 and 23. If the output voltage of the circuit 25 is a binary "1", the switching member 17 connects the switching members 11 and 12 to ground voltage (e.g. zero voltage). If the output voltage of the circuit 25 is a binary "0", it is the signal voltage $U_S$ which is connected to the members 11 and 12 via the amplifier 10 and the switching member 16.

Figure 3:
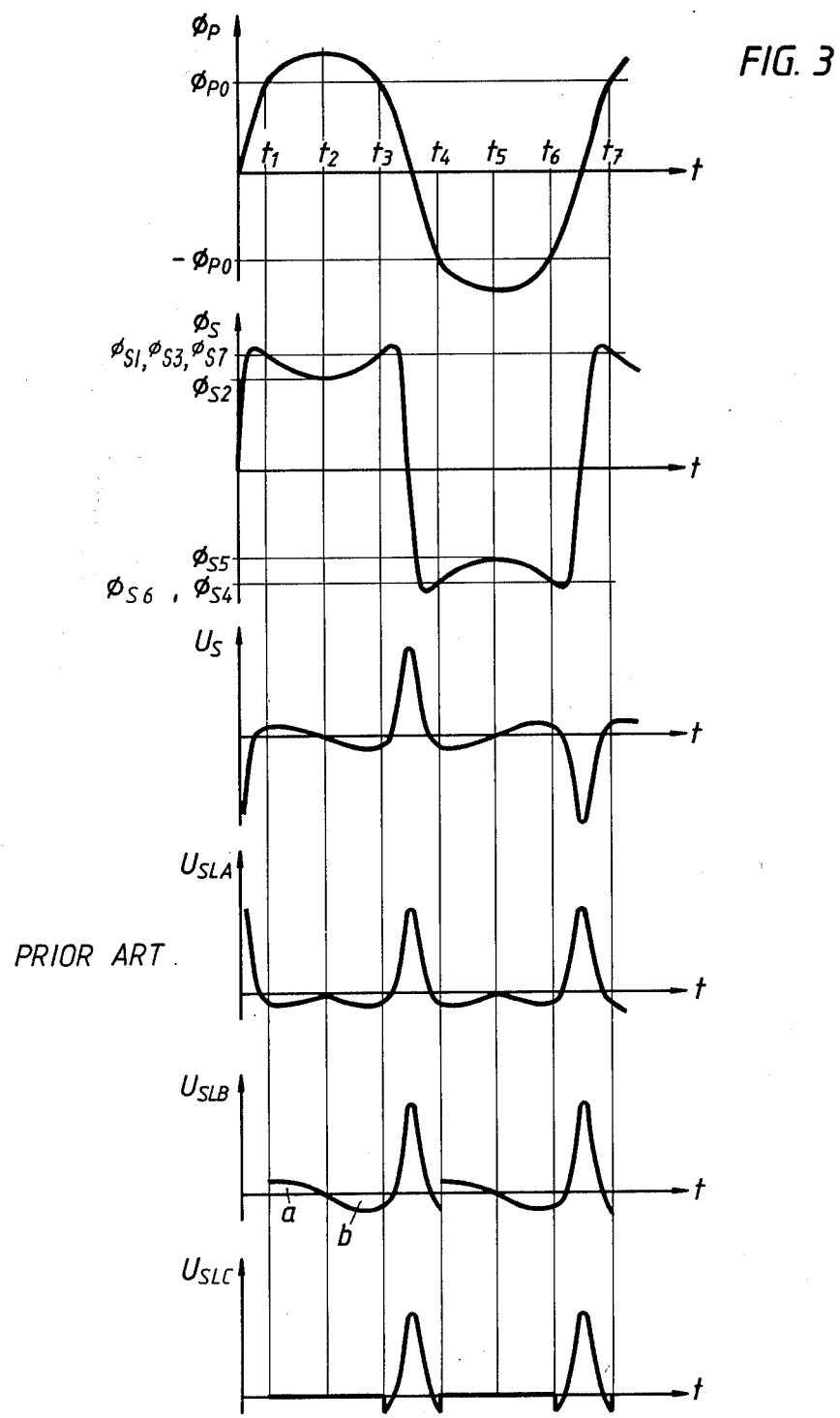
FIG. 3 shows graphically the waveforms for certain quantities discussed.

FIG. 3 illustrates the magnetic sequences in the transducer and different forms of signal rectification. For simplicity, the following analysis assumes initially that the hysteresis in the core of the transducer is negligible, and the primary flux $\phi_P$, generated by the excitation current (shown in the uppermost graph in FIG. 3) is therefore shown as a symmetrical waveform which differs from the waveform of the excitation current (not shown) only by a certain flattening of the peaks. The previously mentioned positive and negative reference levels, are also shown in the uppermost graph as $\phi_{PO}$ and $-\phi_{PO}$, and passage of the primary flux through these reference levels, is used, according to the invention, to control the signal processing, in particular the phase-sensitive rectification. A number of points in time ($t_1$ to $t_7$), have also been indicated in the uppermost graph, these being the characteristic control points for different stages of signal processing which will be discussed.

The second graph in FIG. 3 shows the secondary flux $\phi_S$ induced in the winding 6, which is influenced by the force F, this flux being indicated in a corresponding way over the time interval $t_1$ to $t_7$. The considerably distorted waveform shown in the second graph is due to the fact that the secondary flux can be interpreted as a difference flux between two parts of the primary flux having comparable amplitudes but different harmonic contents. The signal voltage $U_S$, induced by the secondary flux, is consequently very distorted, as will be clear from the third graph in FIG. 3.

The fourth graph in FIG. 3 shows the rectified signal $U_{SLA}$, which occurs if rectification is carried out in a phase-sensitive manner in the usual way with polarity reversal occurring at the times $t_2$ and $t_5$ (i.e. when $\phi_P$ acquires a maximum amplitude). The mean value $U_{MA}$ of the thus-rectified signal $U_{SLA}$ is as follows:

$$U_{MA} = \frac{2}{T} \int_{t_2}^{t_5} -N_S \frac{d\phi_S}{dt} dt =$$

$$-\frac{2}{T} N_S \int_{\phi_{S2}}^{\phi_{S5}} d\phi_S = \frac{2}{T} N_S (\phi_{S2} - \phi_{S5})$$

where T is the period of the excitation current and $N_S$ is the number of turns in the secondary (measuring) winding. If the amplitude or waveform of the excitation current changes, the secondary flux at the times $t_2$ and $t_5$ ($\phi_{S2}$ and $\phi_{S5}$) will also change, thereby altering the value of $U_{MA}$, which is not acceptable.

The present invention avoids the unacceptable dependence of the output signal on the amplitude or waveform of the excitation current by employing a form of signal processing in which the polarity reversal is controlled on the basis of when the primary flux, or the excitation current producing it, with a certain sign of its time rate of change, passes a respective positive and negative reference level.

In the penultimate graph in FIG. 3, the appearance of the rectified signal $U_{SLB}$ is shown for the case where polarity reversal of the signal voltage starts at the time $t_4$, when the primary flux, having a negative time rate of change, passes the negative reference level $-\phi_{PO}$, and terminates at the time $t_7$, when the primary flux with a positive time rate of change passes the positive reference level $\phi_{PO}$. The mean value $U_{MB}$ of the rectified signal $U_{SLB}$, according to the previous formula now becomes:

$$U_{MB} = -2/T\, N_S\, (\phi_{S4} - \phi_{S7})$$

The secondary flux $\phi_S$ is (in the case of negligible hysteresis) an unambiguous function of the primary flux $\phi_P$ and the force F applied on the transducer according to the relationship $$\phi_S = f(\phi_P, F)$$

Thus, the time mean value $U_{MB}$ of the signal $U_{SLB}$ is as follows:

$$U_{MB} = -2/T\, N_S\, (f(\phi_{P4}, F) - f(\phi_{P7}, F))$$

However, since $\phi_{P4} = -\phi_{PO}$ and $\phi_{P7} = +\phi_{PO}$, the following is obtained:

$$U_{MB} = -2/T\, N_S\, (f(-\phi_{PO}, F) - f(\phi_{PO}, F))$$

If, as has been assumed previously, the material is free of hysteresis, $U_{MB}$ will now be independent of variations in the primary flux $\phi_P$ for as long as the peak amplitudes exceed $\pm \phi_{PO}$. This is also illustrated by the waveform for $U_{SLB}$, where the area below the curve in the interval $t_1$ to $t_3$ is made up of a positive part a and a seemingly equal negative part b. The similarity between the areas a and b also is a fact in a core free of hysteresis, since the primary flux is then symmetrical about $t_2$.

The circuit according to FIG. 2a gives this function. The flip-flop 24 is set to binary "1" at time $t_1$ during each period and is set to binary "0" at time $t_4$. Between times $t_1$ and $t_4$, therefore, the switching member 11 is conducting and $U_{SLB}$ is equal to $U_S$. Between times $t_4$ and $t_7$, the switching member 12 is conducting and $U_{SLB}$ is equal to $-U_S$. In this way the phase-sensitive rectification according to the invention and the rectified signal $U_{SLB}$ according to the penultimate graph in FIG. 3 are obtained.

In the case of actual core materials with some hysteresis, however, area a is not equal to area b, and it may then be better to eliminate these curve portions, as shown in the lowermost graph in FIG. 3. This shows the appearance of the rectified signal $U_{SLC}$ for the case where polarity reversal of the signal voltage starts at the time $t_6$, when the primary flux having a positive time rate of change passes the negative reference level $-\phi_{PO}$, and terminates at the time $t_7$, when the primary flux having a positive time rate of change passes the positive reference level $\phi_{PO}$. In the time intervals $t_1$ to $t_3$ and $t_4$ to $t_6$, when the primary flux has a higher absolute value than the corresponding reference level, the signal is locked at the zero level. The mean value $U_{MC}$ of the thus-rectified signal $U_{SLC}$ becomes equal to $U_{MB}$ in the type of rectification described immediately before this, but is now less dependent on the hysteresis of the core material.

This mode of operation is obtainable with the circuit shown in FIG. 2b. During the time intervals $t_1$-$t_3$ and $t_4$-$t_6$, the output voltage from the OR circuit 25 is a binary "1". During these intervals, the switching member 17 connects the inputs of the switching members 11, 12 to ground potential, and $U_{SLC}$ becomes zero during these intervals. During the intervals $t_3$-$t_4$ and $t_6$-$t_7$ the output voltage of the OR circuit is a binary "0", and the output is then the same as that produced by the circuit of FIG. 2a, i.e. between times $t_3$ and $t_4$ $U_{SLC}$ is equal to $U_S$ and between times $t_6$ and $t_7$ $U_{SLC}$ is equal to $-U_S$.

In the above-described embodiments according to FIGS. 2a and 2b, it is the excitation current that is employed as a measure of the primary flux and is used to control the signal processing. Alternatively, however, the primary flux can be sensed directly and used for the control, or some other suitable quantity, corresponding to the primary flux, can be used.

In the circuit shown in FIG. 2a, the phase-sensitive rectifier (11, 12, 13) is switched over at the times $t_1$, $t_4$ and $t_7$, etc. Alternatively, of course, the switching can be made at the times $t_3$, $t_6$, etc.

In the circuit shown in FIG. 2b, the rectifier is also switched over at the times $t_1$, $t_4$, $t_7$, etc. However, the switching can, of course, be made at any time during the intervals ($t_1$-$t_3$; $t_4$-$t_6$) when the amplitude of the primary flux exceeds the reference levels and the output signal ($U_{SLC}$) is maintained at zero.

The embodiments of the invention specifically described above are examples only and many modifications may be made thereto within the scope of the following claims.

What is claimed is:

1. Force measuring equipment comprising a magnetoelastic force transducer having a magnetic core, an excitation winding threading the core, means to supply the excitation winding with alternating current, which generates a primary flux in the core, a measuring winding also threading the core, in which measuring winding a secondary flux proportional to a force applied to the core, induces a signal voltage, and signal processing means including switchable polarity reversal means for generating an output signal by periodic polarity reversal of the signal voltage, the improvement comprising the signal processing means includes control means arranged to sense when the primary flux passes a positive and a negative reference level and to switch the polarity reversal means at the times during each period of the alternating current when the primary flux with a certain sign of its time rate of change passes the positive reference level and when the primary flux with the opposite sign of its time rate of change passes the negative reference level.

2. Force measuring equipment according to claim 1, which further includes means arranged to generate an electrical quantity corresponding to the primary flux, and to supply this quantity to said control means.

3. Force measuring equipment according to claim 2, in which the quantity corresponding to the primary flux consists of a voltage which is proportional to the current in the excitation winding.

4. Force measuring equipment according to claim 1, in which the signal processing means includes means arranged to maintain the output signal at zero during the time intervals when the instantaneous value of the primary flux lies outside the region located between the positive and negative reference levels.

* * * * *